(No Model.)
H. G. HARRIS & W. BLACKMORE.
VELOCIPEDE.
No. 601,254. Patented Mar. 29, 1898.
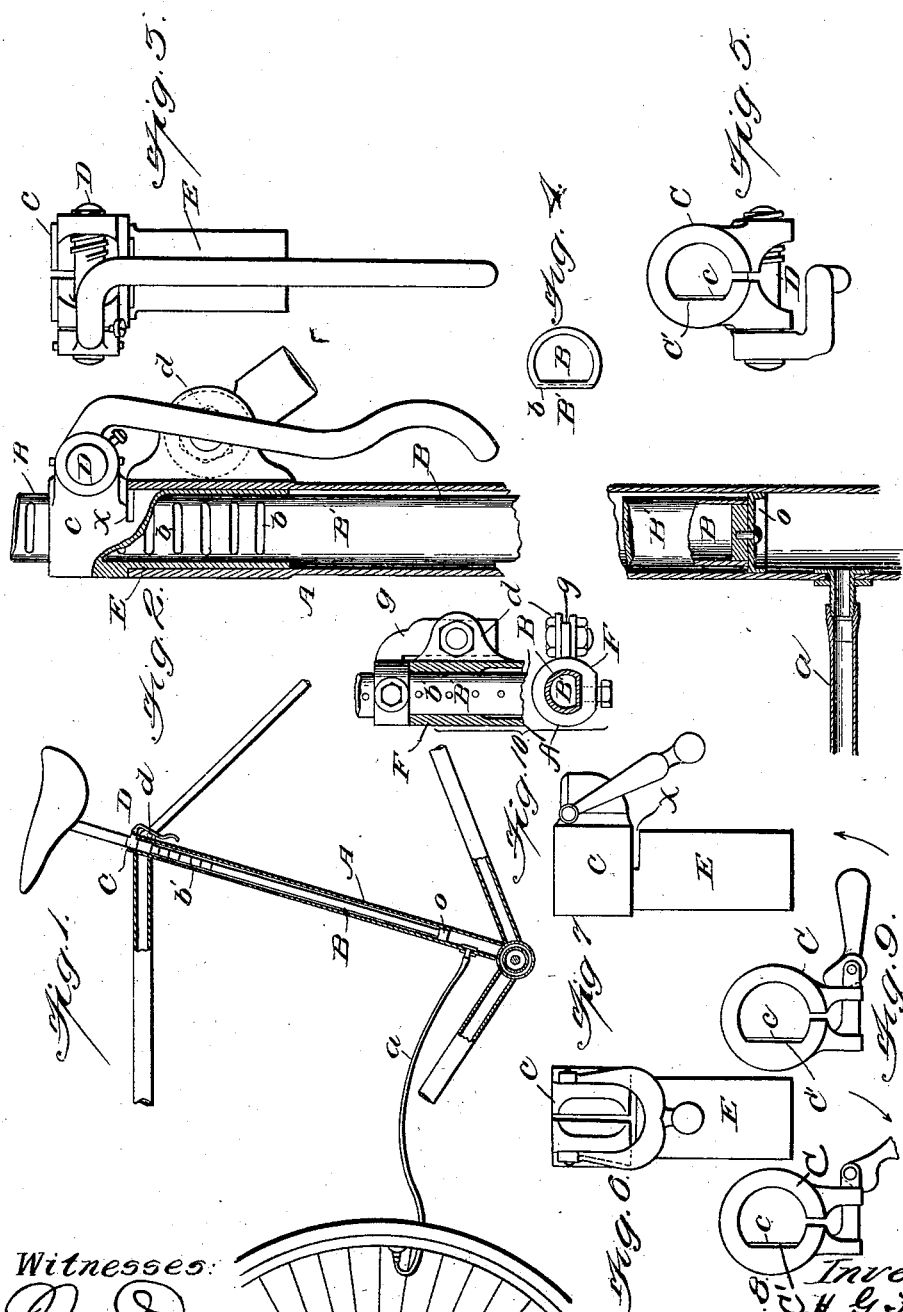
Witnesses:
Walter D. Donaldson
C. S. Middleton
Inventors
H. G. Harris
Wm. Blackmore
by Richards & Co.
Att'ys.

UNITED STATES PATENT OFFICE.

HERBERT GEORGE HARRIS AND WILLIAM BLACKMORE, OF LONDON, ENGLAND, ASSIGNORS TO THE WARWICK CYCLE SYNDICATE, LIMITED, OF SAME PLACE.

VELOCIPEDE.

SPECIFICATION forming part of Letters Patent No. 601,254, dated March 29, 1898.

Application filed March 3, 1897. Serial No. 625,886. (No model.) Patented in England August 12, 1896, No. 17,886, and in Germany October 8, 1896, Nos. 64,544 and 64,545.

*To all whom it may concern:*

Be it known that we, HERBERT GEORGE HARRIS, commercial traveler, and WILLIAM BLACKMORE, clerk, subjects of the Queen of Great Britain, and residents of The Crescent, Weybridge, Surrey, London, England, have invented certain new and useful Improvements in Velocipedes, (for which we have obtained patents in Great Britain, No. 17,886, bearing date August 12, 1896, and in Germany, utility patents, Nos. 64,544 and 64,545, bearing date October 8, 1896,) of which the following is a specification.

Referring to the drawings which form a part of this specification, Figure 1 shows diagrammatically the adaptation of our invention to a cycle of ordinary construction; and Figs. 2 to 10, inclusive, details fully described hereinafter.

The object of our invention is to dispense with the necessity of employing a pump or inflater separate from the machine itself. With this object, as shown in Figs. 1 and 2, we utilize the seat-pillar tube A of the frame of the cycle as the cylinder of the pump or inflating contrivance, and we lengthen or extend the tree or stem of the seat-pillar B to serve as the piston-rod and plunger or piston O, provision being made for the air inlet and outlet orifices and the connections by flexible tubing $a$ with the tire-valves. The seat-pillar is secured in place by a clip or collar C, hereinafter described, so constructed that it can be instantly released and the piston or plunger B raised and lowered in the act of inflating, the operator employing the saddle or upper end of the seat-pillar as the handle of the pump.

According to our invention the seat-pillar tree or stem B (shown in transverse section, Fig. 4) instead of being round, as is usually the case, is formed with a flat side or sides B', and may have several transverse grooves $b$, ridges, or perforations. The spring clip, collar, or clamp C is situated at the mouth or top end of the seat-pillar tube or socket A, which receives the said stem B, and is also either similarly shaped internally, as at C', Fig. 5, or it may be fitted or formed with a plug or rib $c$, corresponding with the grooves $b$, ridges, or perforations formed in or upon the tree or stem of the pillar B, as above described. For ready attachment to existing cycles the clip C is formed with a sleeve or extension E, secured in the mouth of the seat-tube A by suitable means, such as the usual lugs and bolt $d$. When the clip, collar, or clamp is tightened up, the aforesaid flat side C' or plug or ridge $c$ is caused to close upon and engage with the corresponding flat side B' or grooves $b$ or perforations $b'$ on the pillar-stem B.

In order to permit of the instantaneous tightening or locking and untightening or unlocking of the clip or clamp C, we provide it with a quick-threaded screw D or an equivalent mechanical contrivance—such, for instance, as an eccentric lever, Figs. 8 and 9, or cam and wedge faces, Figs. 6 and 7—preferably so arranged that only half a turn or less of the screw D or lever would be needed to obtain the required grip on the seat-pillar. In some instances we may dispense with the grooves $b$ and ribs $c$, in which case a graduated scale may be provided on the flat side of the seat-pillar to facilitate readjustment after the pumping operation has been completed.

If desired, in lieu of the clip C we sometimes may employ an adjustable collar F, Fig. 10, for holding the seat-pillar at the required height and supporting the weight of the rider, in which case to prevent the seat-pillar from turning we form or provide the mouth of the seat-pillar tube with a flat side corresponding to the flat side B' on the seat-pillar B, or an ear $g$ on the adjustable collar F may be added for the same purpose and secured by the lugs $d$. If convenient, a longitudinal rib and corresponding groove may be formed on the seat-pillar and tube in place of the flat sides B' C'.

By this invention the existing parts of the cycle not only constitute the cylinder, piston, and handle of the pump, but the special shape of the saddletree or seat-pillar insures that the peak of the saddle will always point in the required direction and prevent the saddle turning or slipping around. In addition the spring clip or clamp enables the saddle to be instantaneously adjusted and locked at any required height, while the grooves or ridges in the seat-pillar serve to relieve the pressure on the clamping cam or screw.

It will be seen from Figs. 2 and 7 that the split collar has a cylindrical extension which is adapted to fit into the top of the seat-pillar, and this cylindrical extension is divided from the main part of the clip by the kerf or slot $x$, extending horizontally from the periphery of the said parts.

Having now described our invention, what we claim as new, and desire to secure by Letters Patent, is—

In combination with the saddle and its post having a grooved flattened face, the tubular part to receive the post, said tubular part having a split collar supported at its upper end with means for clamping the collar, said collar having also a flattened face with a rib to interlock with the groove in the post and a cylindrical extension divided from the main part of the collar by a horizontal kerf, substantially as described.

In witness whereof we have hereunto set our hands in presence of two witnesses.

HERBERT GEORGE HARRIS.
WILLIAM BLACKMORE.

Witnesses:
BENJ. V. KING,
CHARLES H. SKILLETER.